Aug. 7, 1928.
J. M. FEDDERS
1,679,517
CORE FOR RADIATORS
Filed Sept. 23, 1925      2 Sheets-Sheet 1
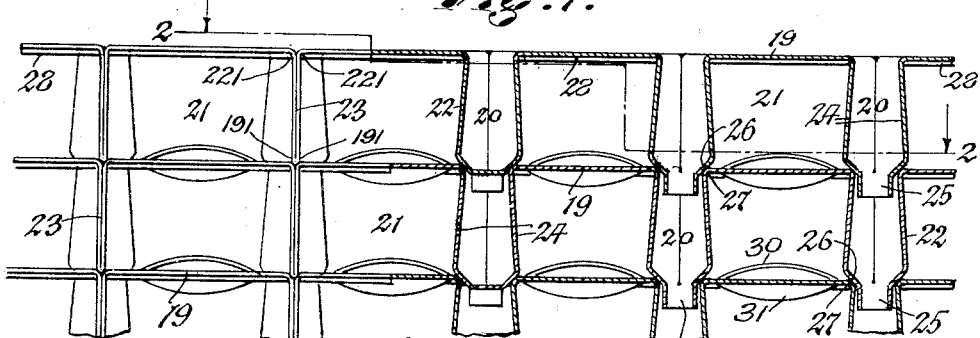
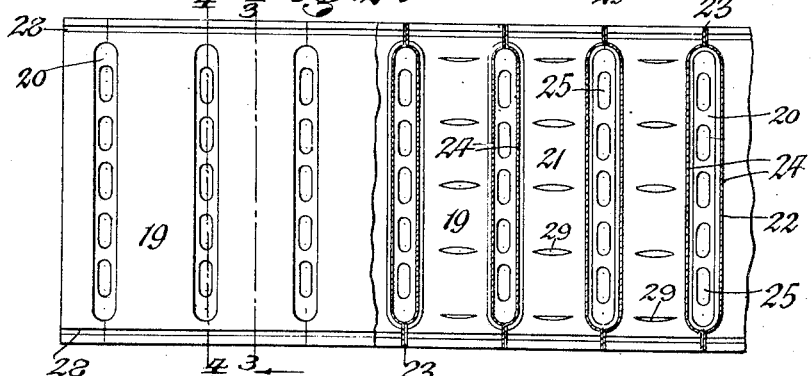
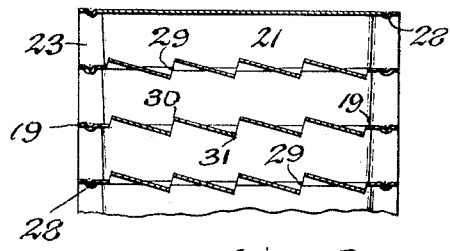
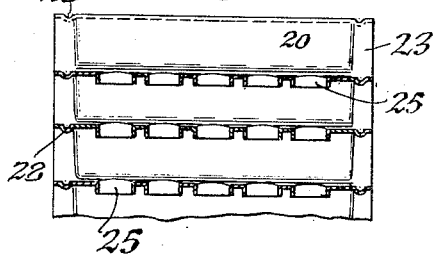
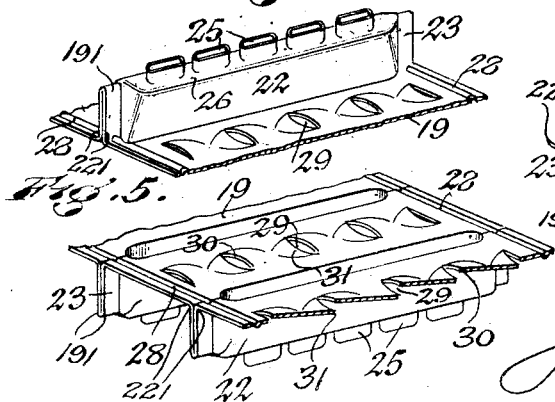
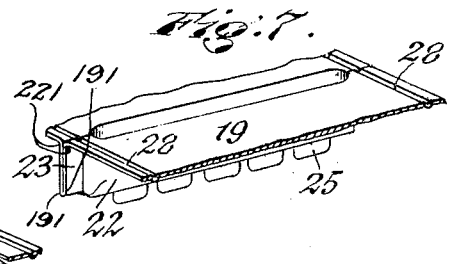

Aug. 7, 1928.  J. M. FEDDERS  1,679,517
CORE FOR RADIATORS
Filed Sept. 23, 1925   2 Sheets-Sheet 2
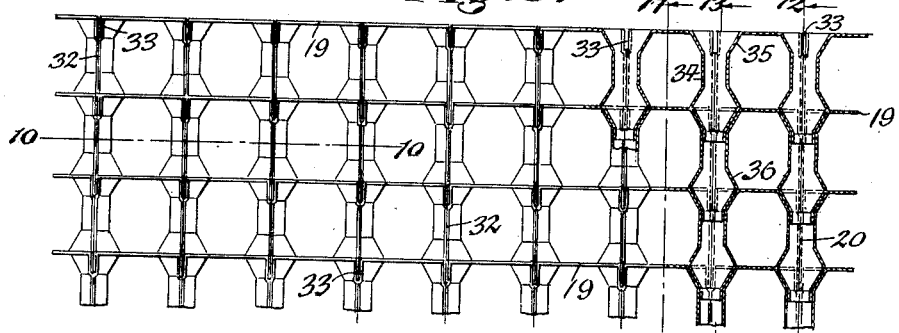
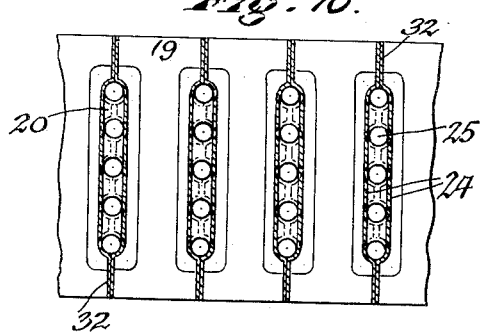
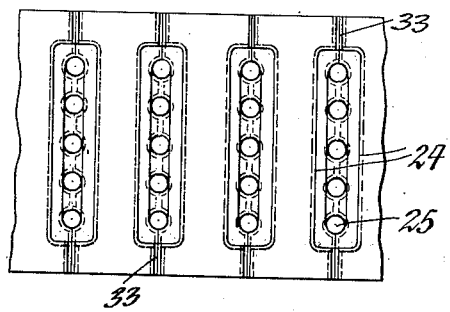
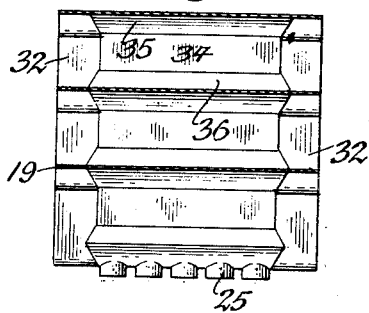
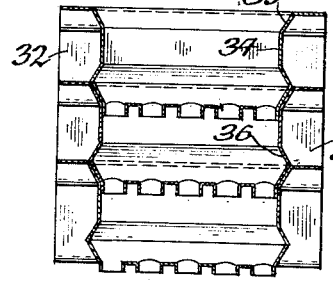
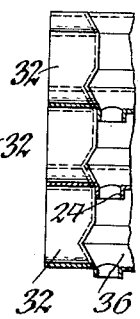
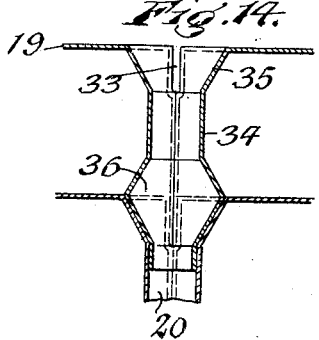
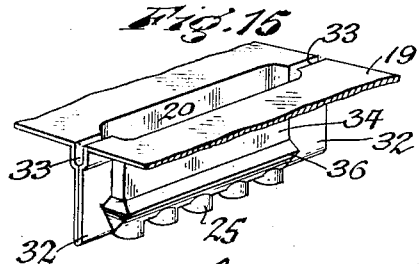

Patented Aug. 7, 1928.

1,679,517

UNITED STATES PATENT OFFICE.

JOHN M. FEDDERS, OF BUFFALO, NEW YORK, ASSIGNOR TO FEDDERS MANUFACTURING COMPANY, INC., A CORPORATION OF NEW YORK.

CORE FOR RADIATORS.

Application filed September 23, 1925. Serial No. 58,074.

This invention relates to a core for radiators such as are commonly used for cooling the water of gas engines and similar installations. The purpose of this invention is to provide a core for such radiators which can be made more rapidly and easily and still furnish a maximum amount of radiation for a given amount of metal, thereby enabling such articles to be manufactured with greater economy and permit of a more general use of the same.

In the accompanying drawings:—

Fig. 1, is a fragmentary elevation of a radiator core embodying my invention, partly in section.

Fig. 2, is a horizontal section of the same taken on line 2—2 Fig. 1.

Figs. 3, 4, are vertical longitudinal sections of the same taken on the correspondingly numbered lines in Fig. 2.

Fig. 5, is a fragmentary perspective view of one of the intermediate units of the core constructed in accordance with my invention viewed from the upper side thereof.

Fig. 6, is a similar view of the same but viewed from the underside thereof.

Fig. 7, is a fragmentary perspective view of one of the end units of my improved radiator core.

Fig. 8, is a fragmentary elevation, partly in section, of a radiator core constructed in accordance with a modification of my invention.

Fig. 9, is a top plan view thereof.

Fig. 10, is a horizontal section of the same taken on line 10—10 Fig. 8.

Figs. 11, 12 and 13, are vertical longitudinal sections taken on the correspondingly numbered lines in Fig. 8.

Fig. 14, is a fragmentary vertical cross-section, on an enlarged scale, of two adjacent units of a radiator core made in accordance with my invention.

Fig. 15, is a fragmentary perspective view of a unit forming part of the radiator core shown in Figs. 8–14. Similar characters of reference indicate corresponding parts in the several figures of the drawings:—

In its completed form the radiator core forming the subject of the invention provides a plurality of parallel water conduits 20 which in the present case are arranged vertically and a plurality of air passages 21 intercalated with the water conduits and extending horizontally from the front to the rear side of the radiator core.

These water conduits and air passages are formed by means of a plurality of sheet metal units which are constructed and assembled in accordance with my invention. In the present case these units are superposed so as to form a vertical tier, stack or pile and the several units are connected with each other by soldering so that the core as a whole forms one solid mass which is strong and durable and not liable to be loosened, distorted or give way under unusually heavy strains or loads which may be imposed on the same.

Each of these units is preferably constructed from a single sheet of metal which is bent to form a plurality of pleats the walls or plies 22 of which are upright and project downwardly and the corresponding pairs of lower longitudinal or outer edges 221 of each pleat being connected with each other, and a plurality of horizontal webs 19 each of which connects the upper or inner longitudinal edge 191 of one wall of a pleat with the corresponding inner or upper edge 191 of the wall of an adjacent pleat of the unit.

At the opposite ends of each pleat the metal of its walls is offset toward each other, as shown at 23, and securely united by soldering so as to form a leaktight joint therebetween. The intermediate parts 24 of the walls of each pleat are spaced apart and at its lower or outer end the same is provided with a longitudinal row of downwardly projecting nipples 25 so that in effect each pleat forms a water tube section. The intermediate or spread parts of the walls of each tube section are preferably flared downwardly by spacing the lower parts of those walls farther apart than the upper parts thereof, thereby providing downwardly facing longitudinal shoulders 26 on the lower end of this tube section which are tapered or beveled downwardly.

In the assembled condition of a plurality of radiator units the beveled shoulders of the tube sections of one unit engage with the slightly rounded seats 27 at the upper or inner ends of the tube sections of the next lower of adjacent unit and a leaktight joint is formed therebetween by soldering. The inwardly offset end portions 23 of the several tube sections in each row rest against each other at their inner and outer edges and are connected by soldering so that they form lines centrally at opposite ends of the water tube sections. When a plurality of units are thus assembled the nipples at the outer ends of the water tube sections of one unit project into the inner ends of the water tube sections of an adjacent unit so that the several water tube sections in one row communicate with each other and produce a continuous water tube which constitutes one of the water conduits of the radiator.

When a plurality of units are thus assembled the same also form a plurality of air passages 21, each of these passages being formed between the opposing walls of two water tube sections on one unit and between the web connecting these walls and the corresponding web of the adjacent unit.

When associated with other parts which make up a complete radiator the heated water to be cooled is introduced into one end of the water tubes and discharged from the opposite ends thereof for which purpose the ends of these water tubes open into water supply and delivery manifolds, boxes or headers which are not shown in the drawings and which may be connected with the opposite ends of the water tubes in any suitable and well known manner.

For the purpose of stiffening the units and preventing the radiator from yielding under undue pressure applied thereto in the plane of the webs, each of the latter is provided adjacent to its edges with ribs or corrugations 28 which materially strengthen the core as a whole and prevent the webs from buckling or becoming distorted when building up the radiator and also when the same is in use.

In order to increase the radiating efficiency of this radiator baffle means are provided whereby the passage of the air through the air conduits is intercepted and a greater amount of heat is absorbed by the air than would otherwise occur. The preferred means for this purpose consist in providing each of the webs, excepting those at the extremities of the water tubes, with a plurality of transverse openings or slits 29 which are arranged in a longitudinal row, and bending those portions of the metal of those webs adjacent to those slits alternating upwardly and downwardly to form baffles or wings 30, 31 which obstruct the passage of the air and compel the same to take a tortuous course through the air passage and absorb an increased amount of heat from the water from the time the air enters the front side of the radiator until it leaves at the rear side of the same.

The webs of the units arranged at the opposite ends of the water tubes are not provided with slits or openings, as shown in Figs. 1, 2, 3, and 7, thereby preventing passage of water from the headers into the air passages.

In the modified form of this invention shown in Figs. 8–15 each of the tube sections on one unit is somewhat deeper and each tube section has the lower or outer edge of its inwardly offset ends 32 engaging with a grooved seat 33 at the inner end of the offset end portions of the tube section of an adjacent unit, and each tube section is constructed to form a contracted central part 34, an upwardly flaring upper part 35, and a laterally bulging lower part 36 which fits the flaring upper part of the tube section of an adjacent unit.

In the structure shown in Figs. 8–15 the webs are not provided with baffle means but, if desired, the same may be employed thereon in the same manner shown in Figs 1–7. The form of the nipples whereby communication is established between the tube sections of adjacent units may be varied, the same being of elongated form in Figs. 1–7 and of rounded form in Figs. 8–15.

I claim as my invention:—

A radiator core having a plurality of water tubes and a plurality of air passages intercalated with said water tubes, said core comprising a plurality of units arranged adjacent to each other and each unit being constructed of a sheet of metal which is bent to form a plurality of pleats and a plurality of webs, the walls of each pleat being spaced apart but connected with each other at one pair of corresponding longitudinal outer edges while their transverse edges at the ends thereof abut against one another to form a tube section, and each of said webs connecting the opposite longitudinal inner edge of one wall of a tube section with the corresponding longitudinal inner edge of the wall of an adjacent tube section, the outer ends of the tube sections of one unit engaging the inner ends of the tube sections of an adjacent unit and provided with a plurality of nipples which open in the tube sections of the adjacent unit to form said water tubes, and the webs of adjacent units being spaced apart to form said air passages.

JOHN M. FEDDERS.